(12) United States Patent
Cook et al.

(10) Patent No.: US 7,984,641 B2
(45) Date of Patent: Jul. 26, 2011

(54) METHOD AND TEST FIXTURE FOR EVALUATING A LUBRICATION CONTAINMENT SYSTEM

(75) Inventors: Doug Cook, Indianapolis, IN (US); Brad Chaplin, Speedway, IN (US); Al Cookerly, Brownsberg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 497 days.

(21) Appl. No.: 12/171,604

(22) Filed: Jul. 11, 2008

(65) Prior Publication Data

US 2010/0005912 A1 Jan. 14, 2010

(51) Int. Cl.
*G01N 33/26* (2006.01)
(52) U.S. Cl. ...................................... 73/53.05
(58) Field of Classification Search ......... 73/46
See application file for complete search history.

(56) References Cited

U.S. PATENT DOCUMENTS 4,128,831 A * 12/1978 Rensch et al. ............. 340/605

* cited by examiner

*Primary Examiner* — Hezron Williams
*Assistant Examiner* — Alex Devito
(74) *Attorney, Agent, or Firm* — Krieg DeVault LLP

(57) ABSTRACT

A method for evaluating a lubrication containment system is set forth herein. In one lubrication containment system, a seal runner can be fixed to the rotatable structure and seal against a static radial seal supported by the sump housing. The method also includes the step of rotating the structure relative to the sump housing. The method also includes the step of directing test fluid to the structure inside the sump housing. The method also includes the step of quantifying an accumulation of test lubricant at the seal runner during rotation by omitting the radial seal from the lubrication containment system. As a result, test lubricant can pass out of the sump housing. The amount of test lubricant that passes out of the sump housing, past the location where the seal runner would be or would have been, corresponds to the amount of lubricant that accumulates at the seal runner during operation in the field. It is desirable to minimize this accumulation; accumulation of lubricant at the seal runner can compromise the life and effectiveness of the seal runner. The test results derived from practicing the method can be applied to design aspects of the lubrication containment system, including the seal runner as well as other structures. A test fixture is also set forth for practicing at least one embodiment of the method.

8 Claims, 4 Drawing Sheets

METHOD AND TEST FIXTURE FOR EVALUATING A LUBRICATION CONTAINMENT SYSTEM

BACKGROUND OF THE INVENTION

1. Field of the Invention

The invention relates to a method for evaluating a lubrication containment system and also a test fixture for carrying out the method.

2. Description of Related Prior Art

Structures rotating at relatively high speeds are found in many operating environments including, for example, turbine engines for aircraft propulsion and for power generation, turbochargers, superchargers, and reciprocating engines. The rotating structures in these operating environments are often supported by lubricated components such as bearings. Other components in these environments can also receive lubricant, including gears. A stationary structure, such as a sump or sump housing, is often disposed to at least partially enclose the lubricated component in order to collect and/or scavenge the lubricant expelled from the lubricated component. The behavior of the lubricant in the sump housing is often difficult to predict. The performance and life of the lubricant components can be enhanced if the supplied lubricant is removed from the sump effectively and efficiently. If the lubricant is not efficiently removed or controlled then leakage can occur or the oil may be undesirably churned and overheated.

SUMMARY OF THE INVENTION

In summary, the invention is a method for evaluating a lubrication containment system of the type including a sump housing at least partially enclosing a rotatable structure and a radial seal assembly operable to form a seal between the sump housing and the rotatable structure. The exemplary embodiment can also seal axially. In one lubrication containment system applicable to the inventive method, a seal runner can be fixed to the rotatable structure and seal against a static radial seal supported by the sump housing. The method of the invention includes the step of rotating the structure relative to the sump housing. The inventive method also includes the step of directing test fluid to the structure inside the sump housing. The inventive method also includes the step of quantifying an accumulation of test lubricant at the seal runner passing a seal location during rotation by omitting the radial seal from the lubrication containment system. As a result, test lubricant can pass out of the sump housing. The amount of test lubricant that passes out of the sump housing, past the location where the seal runner would be or would have been, corresponds to the amount of lubricant that accumulates at the seal runner during operation in the field. It is desirable to minimize this accumulation; accumulation of lubricant at the seal runner can compromise the life and effectiveness of the seal runner. The test results derived from practicing the inventive method can be applied to design aspects of the lubrication containment system, including the seal runner as well as other structures. A test fixture is also disclosed for practicing at least one embodiment of the inventive method.

BRIEF DESCRIPTION OF THE DRAWINGS

Advantages of the present invention will be readily appreciated as the same becomes better understood by reference to the following detailed description of exemplary embodiments when considered in connection with the accompanying drawings wherein.

DETAILED DESCRIPTION OF THE EXEMPLARY EMBODIMENT

Figure 1:
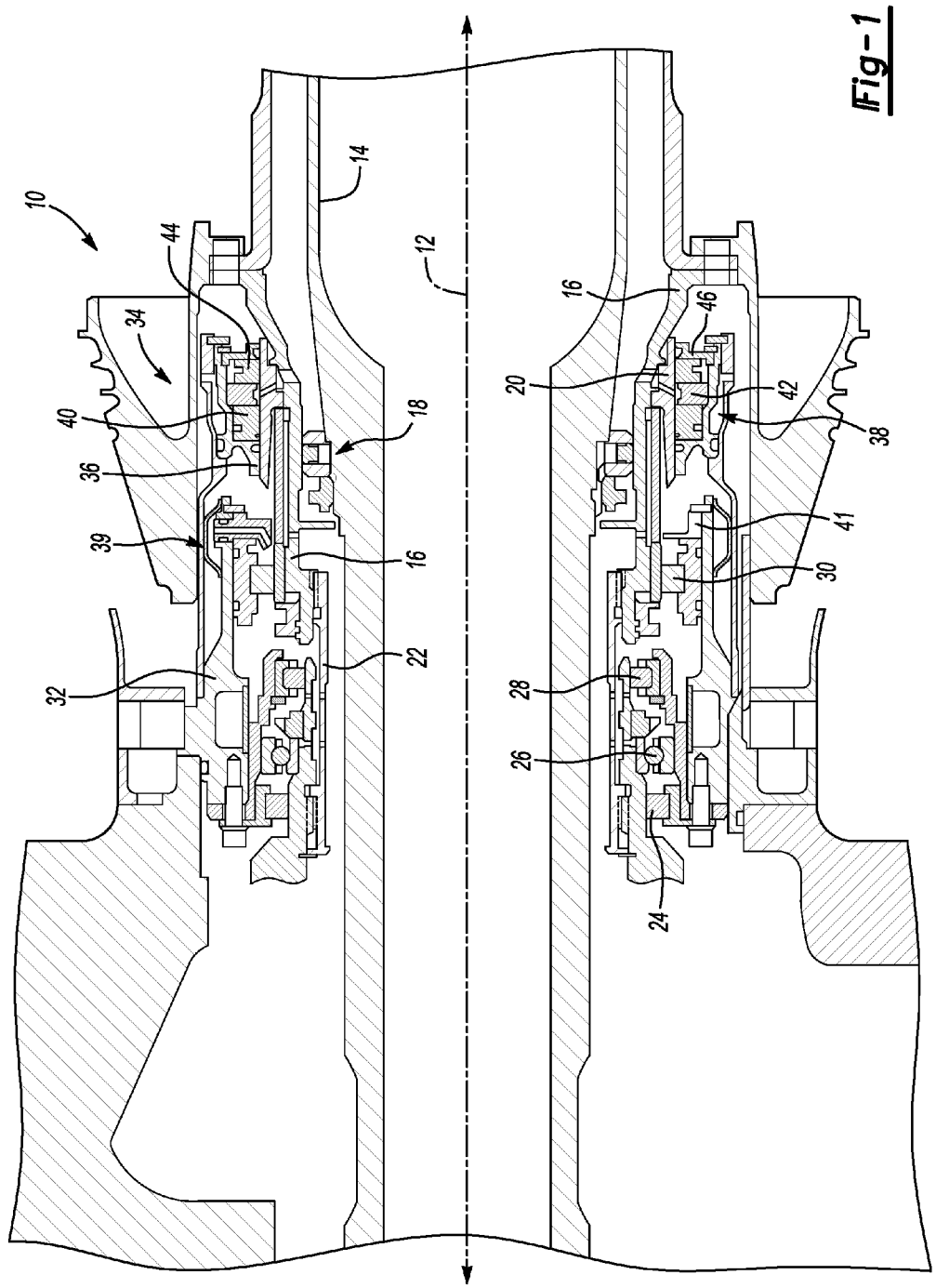
FIG. 1 is a cross-sectional view taken along a centerline axis of a turbine engine and shows an exemplary sump housing for evaluation by an exemplary embodiment of the invention.

A plurality of different embodiments of the invention are shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The invention relates generally to containing or scavenging lubricant. It is important to understand the movement of lubricant in a sump housing in order to maximize the efficiency of scavenging and also to prevent leakage. The movement of the lubricant in the sump housing can be the effected by the design of the sump housing in at least two respects. First, the design of the sump housing can effect the movement of lubricant directly, since the lubricant can flow along surfaces defined the sump housing. Second, the design of the sump housing can effect the movement of lubricant indirectly, since the lubricant can be driven in motion by air flow within the sump housing and the flow of air is at least partially guided by the sump housing.

The movement of the lubricant along the surfaces of the sump housing resulting strictly from the shapes of surfaces in the sump housing can be relatively easy to predict. However, the flow of air in the sump housing, and the effect of air flow on the lubricant, can be difficult to predict through analytical methods or models. The flow of air becomes more difficult to model as the speed of the rotating component increases. The difficulty in predicting air flow thus compromises the ability to reliably predict lubricant movement and, in turn, diminishes the ability to predict scavenging efficiency and leakage potential.

The present invention, as demonstrated in the exemplary embodiments, provides a method and test fixture for overcoming at least some of the difficulty in evaluating lubricant behavior and therefore provides a more reliable method for determining the potential for leakage. In the exemplary embodiment of the invention, the prior art approach of attempting to model air flow can be rejected. Instead, the actual movement of lubricant is assessed by permitting some leakage out of the sump housing; the leakage escaping from the sump housing during testing is recognized as indicative of lubricant movement within the sump housing and also of the potential for leakage.

As described in great detail below, the exemplary embodiment of the invention is directed to one potential source of leakage in a sump housing in a turbine engine, a radial seal assembly. Alternative embodiments of the invention could be directed to other potential sources of leakage. The radial seal assembly of an actual turbine engine can be modified in the form of a test rig such that a static portion of the radial seal assembly is omitted to permit leakage across a rotating portion of the radial seal assembly. The rate of leakage across the rotating portion of the radial seal assembly during testing corresponds to the build-up of lubricant at the radial seal assembly during operation. This build-up can cause and/or contribute to leakage. Therefore, the rate of leakage across the rotating portion of the radial seal assembly during testing corresponds to the potential for leakage across the radial seal assembly during operation.

The extent to which the rate of leakage during testing corresponds to the actual leakage during operation can be more qualitative or anecdotal. However, repeated testing according to the exemplary embodiment of the invention can yield more a quantitative correlation between the rate of leakage during testing and the actual leakage during operation. Furthermore, the rate of leakage during testing can be useful regardless of how closely it can be correlated to actual leakage during operation. For example, the rate of leakage may be considered relatively high and prompt a redesign of the sump housing before testing of an actual turbine engine.

FIG. 1 is a cross-sectional view of a turbine engine 10 taken along a centerline axis 12. The exemplary turbine engine 10 can include a low pressure shaft 14 and a compressor stub shaft 16 encircling the low pressure shaft 14. An inner shaft seal 18 can be disposed between the low pressure shaft 14 and the compressor stub shaft 16. A seal runner 20 can be operably engaged to rotate with the compressor stub shaft 16. A quill shaft 22 can encircle the low pressure shaft 14 and engage the compressor stub shaft 16. A plurality of bearings (shown schematically) 26, 28, 30 can support the compressor stub shaft 16 and quill shaft 22 for rotation and a seal 24 can at least partially seal a cavity in which the bearings 26, 28, 30 are disposed.

Lubricant can be directed to the bearings 26, 28, 30 to enhance the operation and life of the bearings 26, 28, 30 through an oil jet, such as oil jet 39. A baffle 41 is also shown in FIG. 1 radially spaced from the oil jet 39. The lubricant can be at least partially contained with a lubricant containment system including a sump housing 32 and a radial seal assembly 34. The radial seal assembly 34 can include a seal housing 36 supporting a radial seal 38. The exemplary radial seal 38 can include an oil-side carbon seal 40, a spacer 42, and an air-side carbon seal 44. The oil-side carbon seal 40 and the air-side carbon seal 44 seal against the seal runner 32 and can each be formed from a plurality of arcuate segments. The combined segments can form a 360° ring for each of the oil-side carbon seal 40 and the air-side carbon seal 44. As known to those of skill in the art, a seal joint can be formed between adjacent segments of the oil-side carbon seal 40 and the air-side carbon seal 44. The radial seal assembly 34 can also include a locking ring 46 for retaining the radial seal 38 in the seal housing 36.

During operation, if the lubricant received in the sump housing 32 accumulates at the radial seal assembly 36, the life and effectiveness of the radial seal assembly 36 can be compromised. Furthermore, if the life and effectiveness of the radial seal assembly 36 is compromised, leakage can occur. The exemplary embodiment of the invention provides a method for evaluating the accumulation of leakage at the radial seal assembly 36 and also provides a test fixture for carrying out the method.

Figure 2:
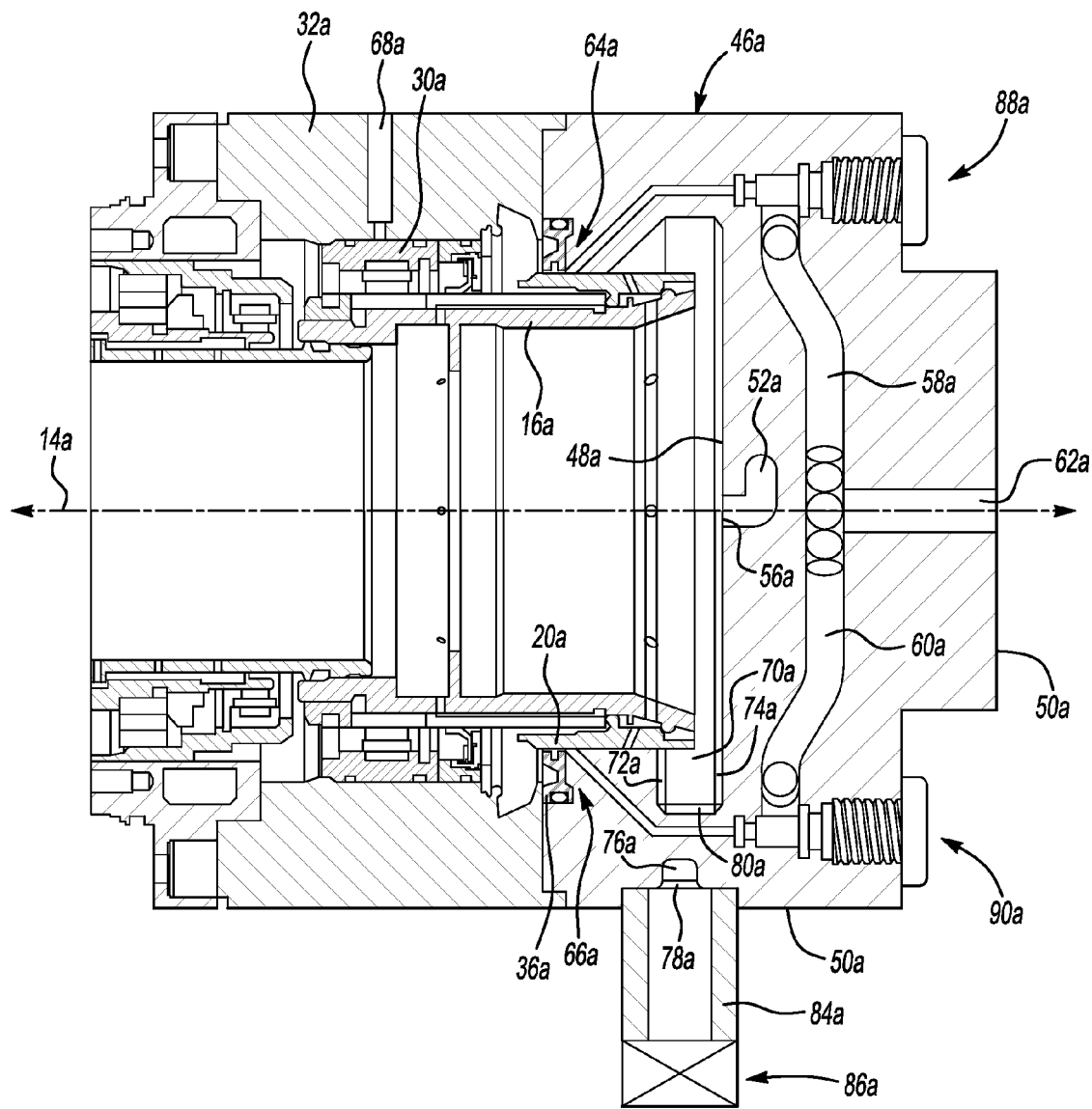
FIG. 2 is a cut-away side view taken along a centerline axis of a turbine engine test rig, wherein a test fixture for practicing an exemplary embodiment of the invention has replaced certain structures shown in FIG. 1.

A test set-up or rig for a first exemplary embodiment is shown in FIG. 2. Comparing FIGS. 1 and 2, the low pressure shaft 14 and the inner shaft seal 18 shown in FIG. 1 have been removed from the test rig shown in FIG. 2. The sump housing 32, seal housing 36 and compressor stub shaft 16 shown in FIG. 1 have been replaced with modified structures, a sump housing 32a, seal housing 36a and compressor stub shaft 16a. The modifications to these structures do not compromise the accuracy of the testing. The seal runner 20 in the turbine engine 10 can be substantially similar to the seal runner 20a in the test rig. A test fixture 46a is mounted to the other structures in the test rig and can support the modified seal housing 36a. The comparison between FIGS. 1 and 2 also reveals that the radial seal 38 shown in FIG. 1 has been omitted from the test rig shown in FIG. 2. This will be discussed in greater detail below.

Referring now only to FIG. 2, in a first step for conducting an exemplary test, the compressor stub shaft 16a and seal runner 20a can be rotated about the centerline axis 14a relative to the text fixture 46a and the sump housing 32a. In a second step, lubricant can be directed into the sump housing 20a through an orifice 68a to be received by a bearing 30a. The test lubricant can be any lubricant used during the operation of the actual turbine engine 10 (shown in FIG. 1) or can be other fluids acceptable for testing such as water. In a third step, fluid such as air can be directed to a circumference of the seal runner 20a from the outside of the sump housing 32a during rotation of the compressor stub shaft 16a and seal runner 20a. The test fixture 46a can act as a manifold, directing one or more fluid streams to the seal runner 20a. Referring now to FIG. 1, during the operation of the actual turbine engine 10, pressurized fluid from outside of the sump housing 32 can act on the seal runner 20 and therefore the test fixture 46a can replicate this condition during testing.

The extent to which lubricant accumulates at the seal runner 20 during operation affects the life and performance of the seal runner 32 as well as of the radial seal 38. Therefore, in the method of the present invention, the radial seal 38 shown in FIG. 1 has been omitted in order to evaluate the extent that lubricant accumulates at the seal runner 20a in FIG. 2. As a result, test lubricant can pass out of the sump housing 32a. Test lubricant can pass out of the sump housing 32a despite the presence of pressurized fluid being directed to the circumference of the seal runner 20a. The amount of test lubricant that passes out of the sump housing 32a in the test rig can correspond to the amount of lubricant that accumulates at the seal runner 32 during operation in the field. For example, a relatively large flow rate of lubricant out of the sump housing 32a during testing can indicate that a relatively large amount of lubricant is accumulating at the seal runner 32 during operation. Further, a relatively large flow rate of lubricant out of the sump housing 32a can prompt a redesign of one or more elements of the lubrication containment system, such as the seal runner 20, the sump housing 32, as well as other structures.

Figure 3:
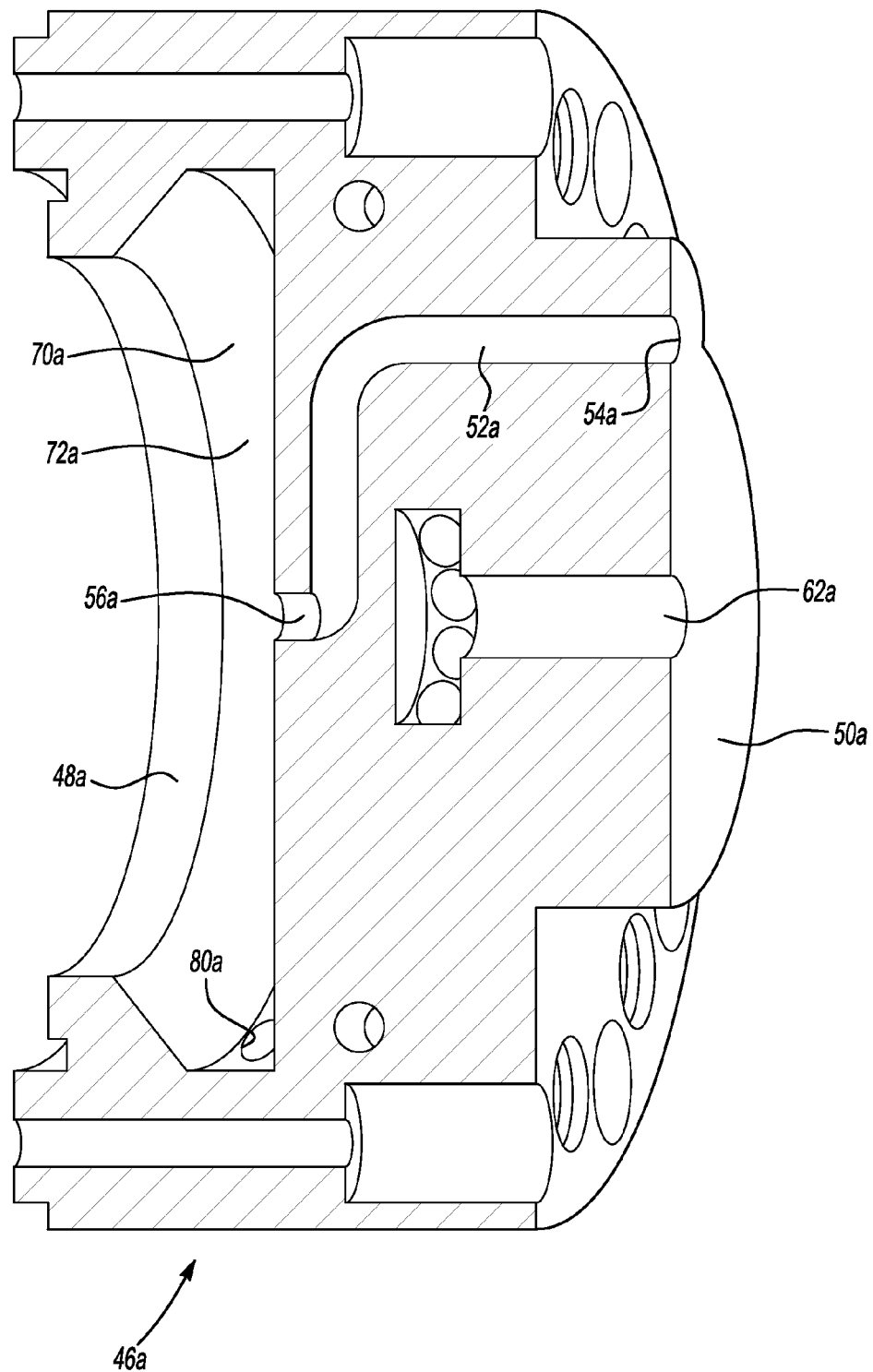
FIG. 3 is a perspective view of a test fixture shown in FIG. 2 and shows the relative configurations of fluid passageways extending through the test fixture.

Referring now to FIGS. 2 and 3, the exemplary test fixture 46a can include a body shaped generally as a cylindrical cap extending along the centerline axis 14a. The text fixture 46a can define interior and exterior surfaces 48a, 50a. A channel 70a can be defined in the interior surface 48a and can include tapered surfaces 72a, 74a to guide the leaked test lubricant to a drain. In the exemplary embodiment of the invention, a drain passageway 76a can be formed in the test fixture 46a and extend between an exit port 78a on the exterior surface 50a and an entry port 80a on the interior surface 48a. The entry port 80a can be positioned at the bottom of the channel 70a.

As best seen in FIG. 2, the leaked test lubricant can move through the drain passageway 76a and be collected in a container 84a. The test can run for a predetermined period of time and the test lubricant collected in the container 84a can then be drained. A valve 86a (shown schematically) can be operably engaged with the container 84a to open after the predetermined period of time. The interior of the test fixture 46a can be pressurized and, as a result, the collected lubricant can be urged out of the container 84a relatively quickly when the valve 86a opens. The drained tested lubricant can be measured and the process repeated as often as required while the compressor stub shaft 16a and seal runner 20a continue to rotate.

Referring again to both FIGS. 1 and 2, the measurements of leaked test lubricant can be applied to redesign the sump housing 32 in the turbine engine 10. For example, the sump housing 32a in FIG. 2 is configured similarly to the sump housing 32 in FIG. 1. If the leakage during testing is greater than desired, it is possible that the internal configuration of the sump housing 32a may be contributing to the accumulation of lubricant at the seal runner 20a. Therefore, the sump housing 32a can be redesigned, resulting in less leakage during subsequent testing. Any such design changes made to the sump housing 32a can be applied to the sump housing 32 as well. This process can be applied to other structures of the turbine engine 10 as well.

As set forth above, pressurized fluid such as air can be directed at the seal runner 20a during testing. As best shown in FIG. 3, a first passageway 52a can extend through the test fixture 46a between a first entry port 54a on the exterior surface 50a and a first exit port 56a on the interior surface 48a. A first stream of fluid can move through the first passageway 52a and be directed to substantially all of the circumference of the seal runner 20a.

As best shown in FIG. 2, a plurality of second passageways, such as second passageways 58a, 60a, can extend through the test fixture 46a between a common, second entry port 62a on the exterior surface 50a and a plurality of individual second exit ports, such as exit ports 64a, 66a on the interior surface 48a. A plurality of second fluid streams can be directed through the second passageways 58a, 60a to discrete positions about the circumference of the seal runner 20a. In the exemplary embodiment of the invention the discrete positions correspond to the positions of seal joints when the radial seal 38 (shown in FIG. 1) is in operation.

The first stream of fluid that passes through the first passageway 52a and the second streams that pass through second passageways 58a, 60a can be drawn from the same source of pressurized fluid or can be drawn from different sources of pressurized fluid.

The exemplary embodiment of the invention can be practiced with several different applications of pressurized fluid. For example, a first test can be completed wherein only the first stream of fluid is directed to the circumference of the seal runner 20a. In the first test, the individual second streams of fluid can be omitted. Alternatively, a second test can be conducted during which only the second streams of fluid are directed to discrete positions about the circumference of the seal runner 20a during testing. In the second test, the first stream of fluid can be omitted. Alternatively, a third test can be conducted in which both the first stream of fluid and the second streams of fluid can be concurrently applied to the seal runner 20a.

Referring now to FIG. 2, a plurality of valves, such as valves 88a, 90a, can be individually positioned along the second passageways 58a, 60a, to control the flows of the second streams of fluid. The valves 88a, 90a can be adjustable to vary the flow rate of individual streams or can be on/off valves. The test fixture 46a can define threaded apertures for receiving the valves 88a, 90a. The test fixture 46a can be formed to include a plurality of aperture patterns in order to test different configurations of radial seals. For example, the position of seal joints may be different for various radial seals and the text fixture 46a can be formed to be a universal fixture.

Figure 4:
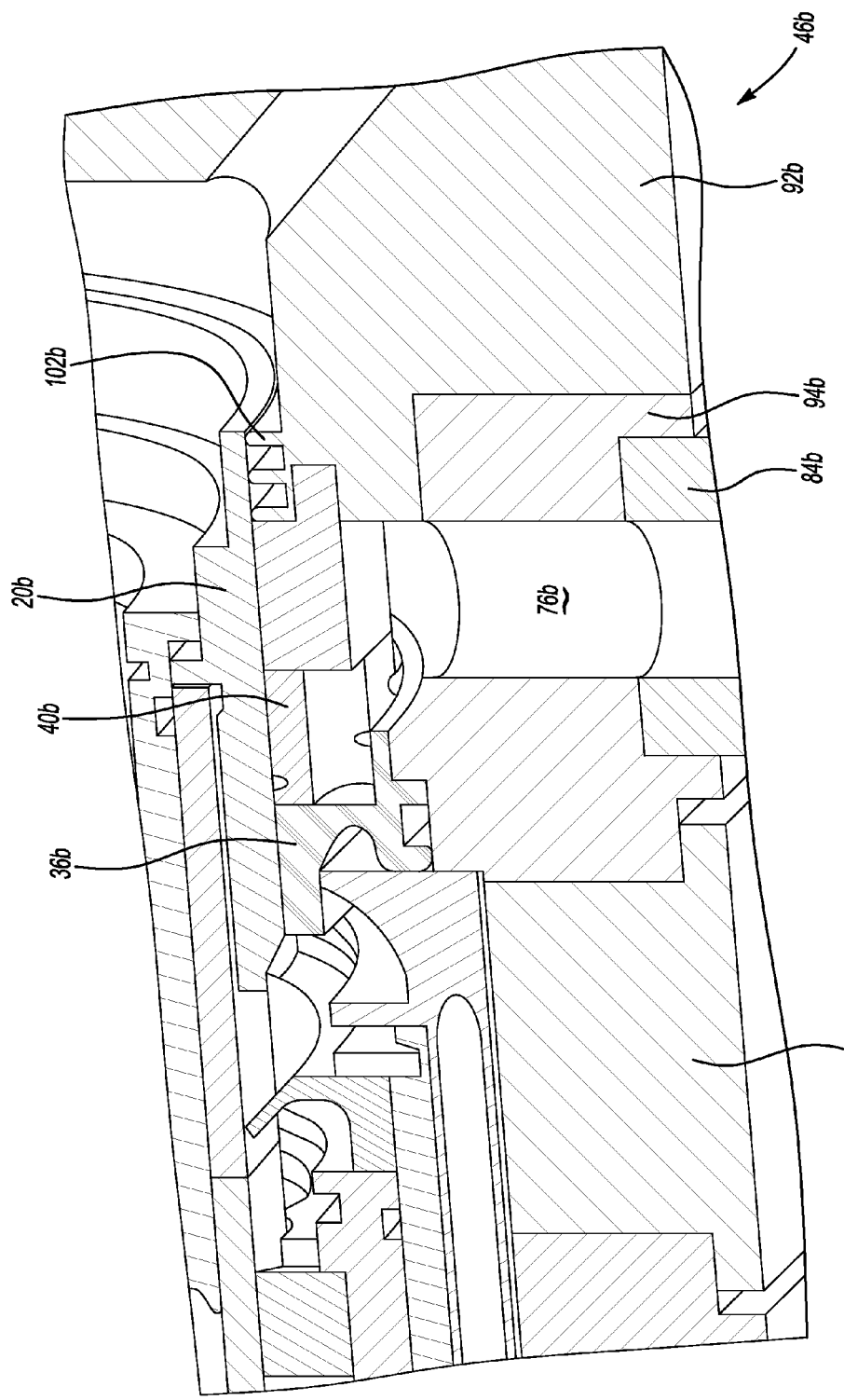
FIG. 4 is a view similar to FIG. 2 and shows an alternative, second exemplary embodiment of the invention.

FIG. 4 shows an alternative embodiment of the invention. A seal housing 36b can be positioned radially adjacent to a seal runner 20b to seal a sump housing 32b. An oil-side carbon seal 40b can be supported by the seal housing 36b. A test fixture 46b is formed by first and second members 92b and 94b and can support the seal housing 36b. The second exemplary test fixture 46b includes one or more annular baffles, such as baffle 102b. The baffle 102b can counteract the effect of windage on the one or more fluid streams directed through the text fixture 46b to the seal runner 20b. A drain passageway 76b can be defined by the second member 94b of the text fixture 46b. Test lubricant can move through the drain passageway 76b and be received in a container 84b for measurement.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for evaluating a lubrication containment system of the type including a sump housing at least partially enclosing a rotatable structure and also including a seal runner fixed to the rotatable structure and operable to seal against a radial seal supported by the sump housing, the method comprising the steps of:
   rotating the structure relative to the sump housing;
   directing test lubricant inside the sump housing to the structure; and
   quantifying an accumulation of test lubricant at the seal runner by omitting the radial seal from the lubrication containment system and allowing test lubricant to pass out of the sump housing across the seal runner.

2. The method of claim 1 further comprising the step of:
   directing a first stream of fluid from outside of the sump housing to substantially all of a circumference of the seal runner.

3. The method of claim 1 wherein the radial seal of the lubrication containment system is formed from a plurality of arcuate segments with a plurality of seal joints defined between adjacent segments, the method further comprising the step of:
   directing individual second streams of fluid from outside of the sump housing to each position about a circumference of the seal runner that corresponds to a location of one of the plurality of seal joints when the radial seal is in operation.

4. The method of claim 3 further comprising the step of:
directing a first stream of fluid from outside of the sump housing to substantially all of the circumference of the seal runner concurrent with said step of directing the individual second streams.

5. The method of claim 4 further comprising the step of:
guiding a flow of the first stream of fluid and the individual flows of the plurality of second streams of fluid with a common manifold.

6. The method of claim 1 wherein said quantifying step is further defined as:
collecting the test lubricant that passes out of the sump housing across the seal runner during said rotating step.

7. The method of claim 6 wherein said gathering step further comprises the steps of:

receiving the test lubricant that passes out of the sump housing with a container for a first predetermined period of time during said rotating step;
draining the test lubricant from the container after the first predetermined period of time; and
receiving the test lubricant that passes out of the sump housing with the container for a second predetermined period of time during said rotating step and after said evacuating step.

8. The method of claim 1 further comprising the step of:
changing a design of the sump housing in response to said quantifying step.

* * * * *